June 21, 1966     J. C. FICKLE ET AL     3,257,010
SILO UNLOADER
Filed Dec. 28, 1964     2 Sheets-Sheet 1
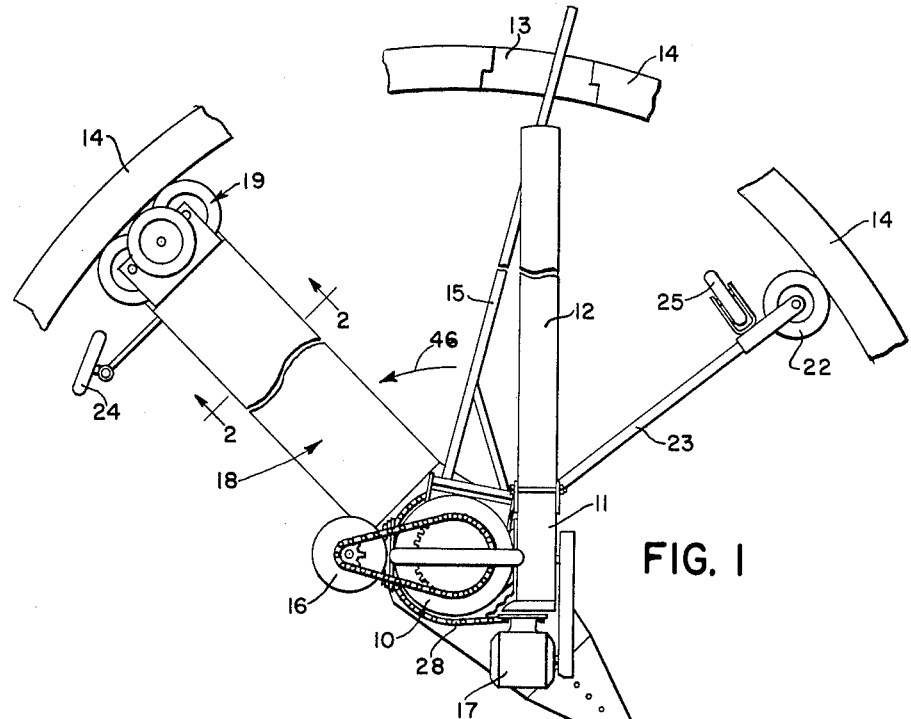
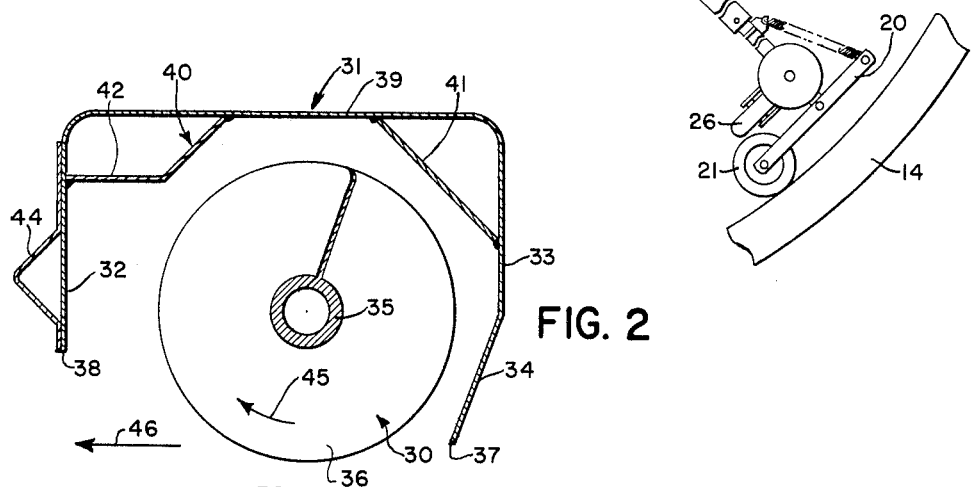
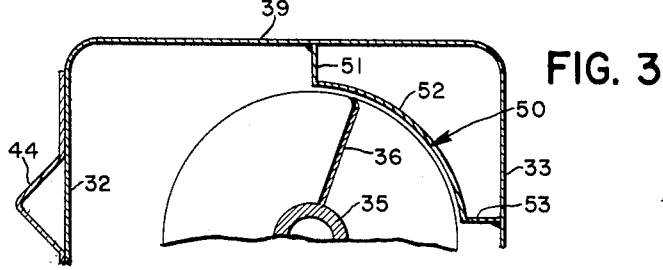
INVENTORS
J. CLARK FICKLE,
ARNOLD B. SKROMME &
ETLAR A. HENNINGSEN
BY William A. Murray
ATTORNEY

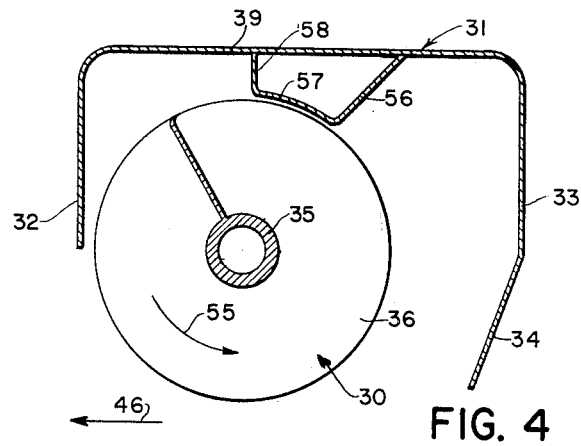
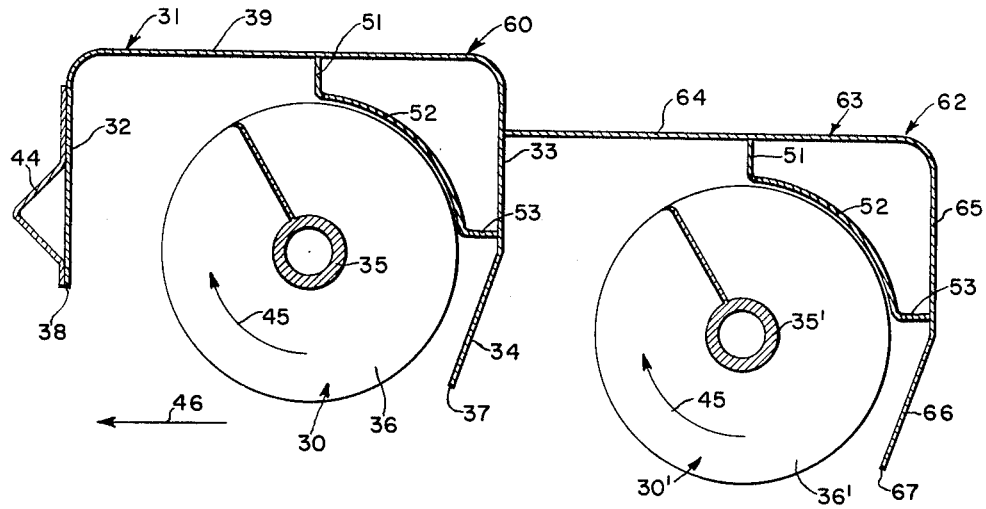

United States Patent Office 3,257,010
Patented June 21, 1966

3,257,010
SILO UNLOADER
J. Clark Fickle, Frankfort, Ind., and Arnold B. Skromme, Moline, and Etlar A. Henningsen, Geneseo, Ill., assignors to Deere & Company, Moline, Ill., a corporation of Illinois
Filed Dec. 28, 1964, Ser. No. 421,376
13 Claims. (Cl. 214—17)

This invention relates to a silo unloader and more particularly relates to the sweep auger structure used on a surface type silo unloader.

When discharging silage from the surface of material in a silo, there is normally provided a sweep mechanism moving over the surface of the silage and driving material from the outer walls radially inwardly to the center of the silo where pickup mechanism is provided that drives it, either by blowing or other type of conveying mechanism, through an opening in the silo wall. Normally the sweep mechanism is composed of a radially extending conveyor between the center of the silo and the silo wall. The sweep conveyor often is composed of one or two augers. One auger has been proven to be unsatisfactory since it does not have the capacity to move large quantities of silage. Two augers are normally, therefore, used and cooperate to move silage between the augers radially inwardly to the discharge mechanism.

With the above in mind, it is the primary purpose of the present invention to provide a single auger sweep with an overlying housing structure of a new and novel disposition relative to the auger that permits a single auger to have very large capacity generally exceeding the capacity of a conventional type two-auger sweep conveyor.

Specifically, it is the purpose of the present invention to provide an overlying housing for the single auger sweep having front and rear vertical walls in advance of and in trailing relation to the auger. The forward or front wall is spaced forwardly from the auger to define with the auger a storage area for silage. Silage in this area will be moved by the flighting on the auger through the interlocking or frictional engagement between the silage in the flighting and the silage in the storage area.

It is a further object of the invention to provide on the trailing or rear wall a downwardly and forwardly inclined portion disposed closely adjacent the rear underside of the auger. The latter feature becomes particularly important when the silo unloader is used in small grain such as corn. In this relation, the corn will not be moved into the storage area at the front of the auger but will be trapped between the rear wall and the auger flighting and will, of course, move along the rear wall. When operating in small grain, capacity is not a great problem. Further, the problem of clogging the sweep mechanism is not present.

Therefore, the storage area offset in advance of the auger and in the space between the side of the housing and the auger flighting is required for moving silage, haylage, and other such material containing long or fibrous matter. The vertical wall closely adjacent the auger is used primarily for moving small grain and other small particled material, although it should be recognized that the latter wall will also cooperate with the flighting to move a quantity of haylage and silage.

It is a further object of the present invention to incorporate with the above type of housing a paneled structure positioned on the housing structure and extending toward the flighting on the sweep auger that blocks the material from passing over the auger to be trapped between the trailing side adjacent the auger and the auger. This, therefore, is primarily for the purpose of preventing clogging in the unit.

Other objects and advantages of the invention will become apparent to those skilled in the art as the nature of the invention is better understood from the following description and as shown in the accompanying drawings.

FIG. 1 is a plan view of the silo unloader and portions of the silo wall.

FIG. 2 is a sectional view taken substantially along the line 2—2 of FIG. 1.

FIG. 3 is a view similar to FIG. 2 showing a slight modification thereof.

FIG. 4 is a view similar to FIG. 2 showing a further modification of the invention.

FIG. 5 is a view similar to FIG. 2 showing still a further modification of the invention.

The silo unloader is, in many respects, similar to one disclosed in U.S. Patent 3,236,399, which issued February 22, 1966 to Raymond S. Wilkes. The present description will be somewhat limited in regard to the structure not pertinent to the present invention, but should further details of this structure be desired, it may be had by referring to this patent.

The silo unloader normally includes a central upright housing chamber 10 containing various impeller mechanism for driving material outwardly and into a blower housing 11 that in turn drives material out of a discharge chute 12 and through a side opening 13 in the silo wall 14. A motion-resisting arm 15 extends from the chamber 10 through the opening 13 and serves the purpose of preventing rotation of the chamber 10. Although not shown, the arm 15 also is provided with an upright support for suspending the outer end of the chute 12. A pair of electric motors 16, 17 is provided for driving sweep mechanism, indicated in its entirety by the reference numeral 18, and the blower contained in the housing 11. The sweep mechanism 18 extends diametrically across the silo. A self-leveling wheel mechanism 19 is provided at one end of the sweep mechanism 18 and engages the wall 14. The wheel-leveling mechanism 19 operates to maintain the sweep 18 horizontal. The exact method of so maintaining it is shown and described in the aforementioned Wilkes patent. The opposite end of the sweep mechanism 18 is provided with a pressure device 20 that includes a spring-loaded wheel 21 engaging the wall 14 to maintain pressure between the leveling wheels 19 and the wall 14. A centering wheel 22 on the outer end of a radial arm 23 engages the wall 14 substantially at 90° from the leveling-wheel device 19 and the pressure-wheel device 20. Suitable gauge wheels 24, 25, 26 are provided in advance of the sweep structure 18 and the arm 23. At the center of the silo, a chain drive 28 operates to drive the entire sweep mechanism around the silo and over the top surface of the silage. Normally the sweep mechanism 18 moves in the counterclockwise direction as viewed from FIG. 1 and indicated by the arrow 46.

All of the aforedescribed mechanism is shown and described in detail in the aforementioned Wilkes structure and consequently has been redescribed only generally for purposes of orientation so that the present invention can be better understood.

Referring now to FIG. 2 for details of the sweep auger structure, it is composed in part of an auger 30 and an overlying U-shaped auger housing 31 opening downwardly and composed of oppositely disposed vertical walls 32, 33. The forward wall 32 lies in advance of the auger 30 in respect to the direction of travel as indicated by the arrow 46. The wall 32 is disposed spacedly forwardly of the flighting of the auger and generally defines with the auger a material storage area in advance of the auger. The rear wall 33 is disposed in a trailing relation in respect to the direction of travel and lies closely adjacent the trailing or rear side of the auger flighting 36. It has a lower downwardly and forwardly inclined section 34 that lies closely adjacent and follows somewhat the contour of the lower rear portion of the auger 30. The auger 30 is composed of a main central shaft portion 35 and flighting 36. The wall portion 34 terminates at a lower edge 37 closely adjacent but above the lower peripheral extremity of the flighting 36. A lower edge 38 of the front wall terminates at a level below the shaft 35 but considerably above the lower extremity of the flighting 36.

The upright walls 32, 33 are interconnected by an overlying panel 39. The walls 32, 39 and 33, 39 are braced by inclined panel structures 40, 41 that lie adjacent the corners of the U-shaped housing 31. The structure 40 has a longitudinal laterally disposed panel 42 extending from the wall 32 inwardly towards the outer edge of the flighting 36. The panel 42 normally defines the upper limits of the aforementioned storage area in the U-shaped housing 31. A channel 44 is fixed to the advance side of the wall 32. In operation, the auger 30 will rotate in a direction indicated by the arrow 45 so that the underside of the auger flighting 36 will move upwardly and in an advanced direction.

When operating, the auger 30 will cut a layer from the surface of the material. If the material is haylage or silage of some type, the material will be interwoven or interlaced to tend not to separate. Consequently, the storage area formed by the walls 32, 42 receives material from the underside of the flighting 36 and retains it in this storage area. Since the latter material is interlaced with the material between the spirals of the flighting 36, the material in the flighting 36 will tend to slide the material in the storage area along the walls 32, 42 and inwardly to the chamber 10 to be discharged by the blower 11 and discharge chute 12. The walls 33, 34 being relatively close to the flighting 36 will also cooperate with the flighting to move material radially inwardly. It is primarily important to provide a large storage area in advance of the auger so that capacity of the unloader will be increased. It is recognized that when using small grain, the storage area will not be utilized to its maximum extent. However, when using small grain, it is necessary to have the walls 33, 34 relatively close to the flighting 36 to permit the grain to move radially inwardly. Consequently, the present sweep mechanism may be utilized to its maximum ability for both the haylage and silage type materials as well as the smaller grain and smaller particle type materials.

In the modification shown in FIG. 3, the entire area in advance of and above the auger flighting 36 is left open and the storage area is composed entirely of the front wall 32 and the lateral or horizontally disposed wall 39. Again, the wall 32 is spaced forwardly in considerable advance of the auger flighting 36. Reinforcing structure 50 is composed of a vertically disposed stripper panel portion 51 extending from the inner surface of the horizontal wall 39 radially inwardly to a position closely adjacent the periphery of the auger flighting 36. The structure further includes an angular or arcuate portion 52 lying relatively closely adjacent the flighting 36 and a lower horizontal portion 53 extending inwardly from the wall 33 and terminating adjacent the flighting 36. In the modification, the storage area is considerably enlarged from the form shown in FIG. 2. The latter modification would operate predominantly where enlarged capacities would be necessary such as in a larger diameter silo.

In the modification shown in FIG. 4, the sweep assembly is moved forwardly in the direction of the arrow 46. The auger 30 is moved or rotated in a counter-clockwise direction, as indicated at 55. The auger 30 is supported in the housing closely adjacent the front or advance wall 32 and spacedly from the rear or trailing wall 33, 34. A stripper plate 56 extends inwardly from the underside of the horizontal wall 39 and terminates closely adjacent the periphery of the flighting 36. It also lies on a radius to the shaft 35. The stripper plate 56 is fixed to an inner arcuate portion 57 overlying the auger flighting 36, the latter being connected to a second radial member 58 extending upwardly to the wall 39. The entire stripper structure 56, 57, 58 operates as a longitudinal reinforcing channel for the entire housing 31. This form of the invention must by necessity operate predominantly in the silage or haylage type of material. It has a distinct advantage of being able to utilize the lower wall portion 34 as part of the entire storage area of the material. As may be clearly evident, the storage area within the housing 31 is that portion of the housing rearwardly of the flighting 36 and terminating at its rear portion by the rear upright walls 33, 34 and its upper side by the rear portion of the wall 39 and the stripper plate 56. Therefore, the overall capacity of such a sweep structure is considerably enlarged as compared to the previous forms where the storage area is directly behind the upright front wall 32. To its disadvantage, this type of structure would not operate as efficiently in grain or small particle material.

In the modification shown in FIG. 5, there is provided an advanced auger structure 60 including the auger 30 and the conventional type auger housing 31, and a trailing auger structure 62 composed of an L-shaped housing 63 and a trailing auger 30'. The auger 30' is composed of an auger shaft 35' and an auger flighting 36'. The leading auger 60 is identical to that form of the of the auger structure shown in FIG. 3 and consequently similar reference numerals are used. The trailing auger structure has an overhead horizontally disposed panel or wall 64 fixed to and extending rearwardly from the upper portion of the upright wall portion 33 and a vertically extending wall trailing the auger structure 31 composed of an upper wall portion 65 and a lower wall portion 66, the latter having substantially the same relation to the auger 36' as the walls 33, 34 have to the auger 36. The auger shaft 35' is spaced vertically below the auger shaft 35 and generally slightly above the lower terminal edge 37 of the lower wall portion 34. The auger flightings 36, 36' are identical, with the flighting 36' being below the flighting 36. The auger structure 30' is positioned closely adjacent the rear upright wall portions 65, 66 but is positioned spacedly behind the wall portions 33, 34 of the advanced auger housing 31. Stripper and structural panels 51, 52, 53 are provided in both housings 31 and 63 for the purpose described relative to the similar structure shown in FIG. 3.

In operation the form of the invention shown in FIG. 5 will operate to sweep forwardly in the direction of the arrow 46 and the forward or advanced auger 30 will operate to move material radially inwardly and to store it while moving it inwardly in the storage area defined by the outer periphery of the flighting 36 and the walls 32, 39 and the inwardly extending panel 51. The trailing auger structure 62, being disposed beneath the auger structure 60, will utilize the wall portions 33, 34 as its advanced wall, which is equivalent to the wall 32 of the advanced auger, and the rear wall portions 65, 66 will operate in an equivalent manner to the walls 33, 34 relative to the advanced auger 30. The lower edge 67 of the lower wall portion 66 is positioned slightly above the lower peripheral extremity of the auger flighting 36'. The lower edge 37 of the wall portion 34 is positioned slightly below the shaft 35' of the trailing auger. In operation, therefore, the forward auger structure 30 will cut and move radially inwardly a level of material. The trailing auger structure 62 following the advanced auger structure 60 will cut a lower depth than the forward structure 60 to thereby substantially increase the capacity of the entire sweep mechanism. The wall portions 33, 34 double in their use as a rear wall of the advanced auger structure 30 and the forward wall of the trailing auger structure 62.

While only the preferred embodiments of the invention have been shown, it should be recognized that other forms and variations of the invention will occur to those skilled in the art. Therefore, while the preferred forms of the invention have been shown and described in detailed manner for the purpose of clearly and concisely illustrating the principles of the invention, it should be understood that there is no intention to limit or narrow the invention beyond the broad concepts set forth in the appended claims.

What is claimed is:

1. A sweep auger structure for a silo unloader adapted to advance around the silo on the surface of the material in the silo, comprising: a horizontally disposed sweep auger having a central shaft means and a spiral flighting formed about the shaft means with the flighting having its underside in engagement with the material; a U-shaped auger housing opening downwardly and overlying the auger with a vertically disposed forward wall in advance of the auger and spaced from the flighting of the auger to define a material storage area in advance of the auger and between the vertically disposed wall and the auger, the wall terminating at a lower edge beneath but substantially at the level of the auger shaft means, the housing further having a rear vertically disposed wall in trailing relation to the auger and in close proximity to the flighting, the latter wall being terminated by a lower horizontal edge at a level spacedly beneath the shaft means and slightly above the lower peripheral extremity of the auger flighting; means rotating the auger whereby the underside of the auger will move upwardly and toward the advanced vertical wall; and a material stripping panel extending inwardly from the inner surface of the housing structure toward the upper side of the auger for blocking material from moving out of the storage area.

2. A sweep auger structure for a silo unloader adapted to advance around the silo on the surface of the material in the silo, comprising: a horizontally disposed sweep auger having a central shaft means and a spiral flighting formed about the shaft means with the flighting having its underside in engagement with the material; an auger housing structure opening downwardly with a vertically disposed forward wall in advance of the auger and spaced from the flighting of the auger to define a material storage area in advance of the auger and between the vertically disposed wall and the auger, the housing further having a rear vertically disposed wall in trailing relation to the auger and in close proximity to the flighting, the walls being terminated by lower edges, the lower edge of the advance wall being above the lower edge of the trailing wall; means rotating the auger whereby the underside of the auger will move upwardly and toward the advanced vertical wall; and a material stripping panel on the housing structure above the auger and disposed to block material from moving out of the storage area.

3. A sweep auger structure for a silo unloader adapted to advance around the silo on the surface of the material in the silo, comprising: a horizontally disposed sweep auger having a central shaft means and a spiral flighting formed about the shaft means with the flighting having its underside in engagement with the material; an auger housing opening downwardly with vertically disposed forward and rear walls in advanced and trailing relation respectively of the auger, with one wall being closely adjacent the auger and the other wall being laterally spaced from the flighting of the auger to define a material storage area between the latter wall and the auger; means rotating the auger whereby the underside of the auger will move upwardly and toward said other wall; and a material stripping panel means on the housing structure above the auger and disposed to block material from moving out of the storage area.

4. The invention defined in claim 3 in which the forward and rear walls have lower edges and the lower edge of the forward wall is above the lower edge of the rear wall, and the lower edge of the rear wall is at a level above, but substantially close to the level of the lower peripheral edge of the underside of the auger flighting.

5. The invention defined in claim 3 in which the forward wall is said other wall and the rear wall extends downwardly beyond the lower edge of the forward wall and has a lower portion inclined downwardly and forwardly around the rear underside of the auger flighting and terminates at an edge above and adjacent the lower peripheral extremity of the flighting.

6. The invention defined in claim 3 in which the rear wall is said other wall, and the lower edge of the rear wall is at a level between the shaft means and the lower peripheral extremity of the auger means.

7. The invention defined in claim 3 in which the housing structure further includes a laterally disposed overhead panel overlying the auger and extending between the vertical walls and serving at least partially as the panel means preventing movement of material out of the storage area.

8. The invention defined in claim 7 in which the panel means also includes a panel extending downwardly from the laterally disposed panel toward the auger flighting to an edge adjacent the flighting.

9. The invention defined in claim 3 in which the panel means includes a laterally extending panel extending toward the auger flighting from said other wall and defining at least in part the upper limits of the storage area.

10. A sweep auger structure for a silo unloader adapted to advance around the silo on the surface of the material in the silo, comprising: a horizontally disposed sweep auger having a central shaft means and a spiral flighting formed about the shaft means with the flighting having its underside in engagement with the material; a vertically disposed wall in advance of and being laterally spaced from the flighting of the auger to define a material storage area between the wall and the auger; means rotating the auger whereby the underside of the auger will move upwardly and toward the wall; and a material stripping panel rigid with the wall and extending toward the upper side of the auger and disposed to block material from moving out of the storage area.

11. A sweep auger structure for a silo unloader adapted to advance around the silo on the surface of the material in the silo, comprising: a horizontally disposed sweep auger having a central shaft means and a spiral flighting formed about the shaft means with the flighting having its underside in engagement with the material; a vertically disposed wall laterally spaced from a side of the auger to define a material storage area between the wall and the auger; means rotating the auger whereby the underside of the auger will move upwardly and toward the wall; and a material stripping panel rigid with the wall and extending toward the upper side of the auger and disposed to block material from moving out of the storage area.

12. A sweep auger structure for a silo unloader adapted to advance around the silo on the surface of the material in the silo, comprising: horizontally disposed sweep auger means having its underside in engagement with the material; an auger housing opening downwardly and overlying the auger means with a vertically disposed forward wall in advance of the auger means and spaced from the auger means to define a material storage area between the wall and the auger means, the housing further having a rear vertically disposed wall in trailing relation to the auger means, the rear wall having a lower horizontal edge beneath the lower edge of the forward wall and at a level slightly above the lower peripheral extremity of the auger means; and means rotating the auger means whereby the underside thereof will advance upwardly and forwardly.

13. The invention defined in claim 12 in which the auger means includes a pair of substantially parallel augers with one in advance of the other, and the advanced auger being offset vertically above the trailing auger, and the housing structure further including a central upright wall disposed between the augers, the lower edge of which is beneath the lower edge of the forward wall and is above the lower edge of the rear wall.

References Cited by the Examiner

UNITED STATES PATENTS

| 1,866,005 | 7/1932 | Beatty | 198—213 |
| 2,864,655 | 12/1958 | Caron. | |
| 3,144,144 | 8/1964 | Sime | 214—17 |

GERALD M. FORLENZA, *Primary Examiner.*

R. SHERIDAN, *Assistant Examiner.*